(12) United States Patent
Kim (10) Patent No.: US 11,016,666 B2
(45) Date of Patent: May 25, 2021

(54) MEMORY SYSTEM AND OPERATING METHOD THEREOF

(71) Applicant: SK hynix Inc., Gyeonggi-do (KR)

(72) Inventor: Hyungsup Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 43 days.

(21) Appl. No.: 16/041,258

(22) Filed: Jul. 20, 2018

(65) Prior Publication Data

US 2019/0138218 A1 May 9, 2019

(30) Foreign Application Priority Data

Nov. 8, 2017 (KR) .......................... 10-2017-0148004

(51) Int. Cl.
*G06F 3/06* (2006.01)

(52) U.S. Cl.
CPC ............ *G06F 3/0607* (2013.01); *G06F 3/061* (2013.01); *G06F 3/067* (2013.01); *G06F 3/0631* (2013.01); *G06F 3/0658* (2013.01); *G06F 3/0665* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 7,065,624 B1 * | 6/2006 | Zahavi | ................ | G06F 11/3414 711/170 |
| 7,085,904 B2 * | 8/2006 | Mizuno | ............... | G06F 11/1451 707/999.202 |
| 8,037,267 B2 | 10/2011 | Jinno et al. | | |
| 8,645,610 B2 | 2/2014 | Chang et al. | | |
| 8,775,988 B2 | 7/2014 | Lavin et al. | | |
| 8,839,032 B2 | 9/2014 | Walton et al. | | |

(Continued)

FOREIGN PATENT DOCUMENTS

| KR | 10-2005-0033060 | 4/2005 |
|---|---|---|
| KR | 1020140078390 | 6/2014 |

(Continued)

OTHER PUBLICATIONS

DDR5 Full Spec Draft Rev0.5g, 2011, 1848.99A, JEDEC.
Gen-Z-Core-Specification-version-1.0, Feb. 13, 2018, pp. 1-983, GEN-Z CONSORTIUM.

*Primary Examiner* — William E. Baughman
(74) *Attorney, Agent, or Firm* — IP & T Group LLP (57) ABSTRACT

A memory system includes a memory blade including a plurality of operation memories; and a controller coupled to the memory blade, wherein the controller includes: a data base (DB) memory suitable for storing a data base (DB) having first information, which is an average usage amount of an operation memory used for processing a generated target workload, as a field and workloads as an entry; an allocation unit suitable for allocating an usage amount of an operation memory for processing a current target workload based on a value of the first information stored in the DB, corresponding to the current target workload requested to be processed; and a monitor suitable for updating the value of the first information to the average usage amount of the operation memory allocated for processing the current target workload after the processing of the current target workload is completed.

19 Claims, 9 Drawing Sheets

(56) References Cited

U.S. PATENT DOCUMENTS

| | | |
|---|---|---|
| 8,954,698 B2 | 2/2015 | Schenfeld et al. |
| 8,954,701 B2 | 2/2015 | Schenfeld et al. |
| 9,104,586 B2 | 8/2015 | Schenfeld et al. |
| 9,104,587 B2 | 8/2015 | Schenfeid et al. |
| 9,110,818 B2 | 8/2015 | Schenfeld et al. |
| 9,128,662 B2 | 9/2015 | Kim et al. |
| 9,152,332 B2 | 10/2015 | Kopylovitz et al. |
| 9,159,374 B2 | 10/2015 | Kim et al. |
| 9,256,547 B2 | 2/2016 | Schenfeld et al. |
| 9,390,047 B2 | 7/2016 | Schenfeid et al. |
| 9,396,026 B2 | 7/2016 | Ichikawa et al. |
| 9,442,854 B2 | 9/2016 | Hyde et al. |
| 9,535,606 B2 | 1/2017 | Krithivas et al. |
| 2004/0054776 A1 | 3/2004 | Klotz et al. |
| 2006/0259621 A1* | 11/2006 | Ranganathan .......... G06F 1/206 709/226 |
| 2008/0222348 A1* | 9/2008 | Mosek .................... G06F 16/10 711/103 |
| 2008/0309349 A1 | 12/2008 | Sutono |
| 2009/0037164 A1* | 2/2009 | Gaither ................ G06F 9/5088 703/21 |
| 2009/0249018 A1* | 10/2009 | Nojima ................ G06F 3/0613 711/170 |
| 2009/0276567 A1* | 11/2009 | Burkey ............... G06F 11/2087 711/114 |
| 2010/0228956 A1 | 9/2010 | Sakamaki |
| 2011/0041005 A1 | 2/2011 | Selinger |
| 2011/0231743 A1 | 9/2011 | Sakamaki |
| 2012/0005556 A1 | 1/2012 | Chang et al. |
| 2012/0179823 A1* | 7/2012 | Hatasaki ................... G06F 3/06 709/226 |
| 2013/0107443 A1 | 5/2013 | Kim et al. |
| 2013/0163175 A1 | 6/2013 | Kim et al. |
| 2013/0275703 A1 | 10/2013 | Schenfeld et al. |
| 2013/0275704 A1 | 10/2013 | Schenfeld et al. |
| 2013/0275705 A1 | 10/2013 | Schenfeld et al. |
| 2013/0275706 A1 | 10/2013 | Schenfeld et al. |
| 2013/0275707 A1 | 10/2013 | Schenfeld et al. |
| 2014/0006898 A1* | 1/2014 | Sharon ................ G06F 11/1072 714/755 |
| 2015/0106564 A1 | 4/2015 | Kopylovitz et al. |
| 2015/0188649 A1 | 7/2015 | Buckler et al. |
| 2015/0254108 A1* | 9/2015 | Kurtzman ............. G06F 9/5016 718/104 |
| 2015/0370697 A1 | 12/2015 | Schenfeld et al. |
| 2016/0154755 A1 | 6/2016 | Schenfeld et al. |
| 2018/0260158 A1* | 9/2018 | Marripudi ............... G06F 11/34 |

FOREIGN PATENT DOCUMENTS

| | | |
|---|---|---|
| KR | 1020160022242 | 2/2016 |
| KR | 1020160072890 | 6/2016 |
| KR | 1020160144560 | 12/2016 |
| KR | 10-2017-0066083 | 6/2017 |

* cited by examiner

MEMORY SYSTEM AND OPERATING METHOD THEREOF

CROSS-REFERENCE TO RELATED APPLICATIONS

The present application claims priority under 35 U.S.C. § 119(a) to Korean Patent Application No. 10-2017-0148004, filed on Nov. 8, 2017, the disclosure of which is incorporated herein by reference in its entirety.

BACKGROUND

1. Field

Various exemplary embodiments of the present invention relate to an electronic device. Particularly, the embodiments relate to a memory system capable of efficiently processing data and an operating method thereof.

2. Description of the Related Art

Data may be considered one of the most important properties for businesses enterprises in the fourth industrial revolution era, and the demand for the latest technology to support the rapid transmission and analysis of large-capacity data has been increasing. For example, the expansion in technologies of artificial intelligence, autonomous navigation, robots, healthcare, virtual reality (VR)/augmented reality (AR) may lead to the growth in demand for servers and data centers.

A legacy data center was a structure where resources, for example, computing, networking, storage, and the like, are included in a single machine. However, a future large-capacity data center may have a structure where the resources are separately constructed and logically reconstructed. For example, the large-capacity data center may have a structure where each of the resources is modularized at a rack level, and reconstructed and provided depending on usage. Therefore, there is a demand for an integrated storage or a memory device suitable for being used in the future large-capacity data center.

SUMMARY

Various embodiments are directed to a memory system capable of efficiently processing data of a memory system and an operating method thereof.

In accordance with an embodiment of the present invention, a memory system includes: a memory blade including a plurality of operation memories; and a controller coupled to the memory blade, wherein the controller includes: a data base (DB) memory suitable for storing a data base (DB) having first information, which is an average usage amount of an operation memory used for processing a generated target workload, as a field and workloads as an entry; an allocation unit suitable for allocating an usage amount of an operation memory for processing a current target workload based on a value of the first information stored in the DB, corresponding to the current target workload requested to be processed; and a monitor suitable for updating the value of the first information to the average usage amount of the operation memory allocated for processing the current target workload after the processing of the current target workload is completed.

In accordance with an embodiment of the present invention, an operating method of a memory system that includes a memory blade including a plurality of operation memories, and a controller includes: checking whether a value of first information corresponding to a target workload requested to be processed is stored in a data base (DB) having the first information, which is an average usage amount of an operation memory used for processing a generated target workload, as a field and workloads as an entry; allocating an usage amount of an operation memory for processing a current target workload based on the value of the first information stored in the DB, corresponding to the current target workload requested to be processed; and updating the value of the first information to the average usage amount of the operation memory allocated for processing the current target workload after the processing of the current target workload is completed.

In accordance with an embodiment of the present invention, a controller coupled to a memory system including at least one memory blade having a plurality of memories, the controller includes at least one internal memory; a first part configured to record an average of usage for a type of workloads based on tracked history of usage regarding the plurality of memories, to the internal memory; a second part configured to assign a specific amount of the plurality of memories to an entered workload, wherein the specific amount is initialized based on the average of usage and adjusted by an attribute of the entered workload; and a third part configured to monitoring a process of the entered workload to update the tracked history of usage in the internal memory.

In accordance with an embodiment of the present invention, a memory system includes a memory blade including a plurality of operation memories; and a controller coupled to the memory blade, wherein the controller includes: a data base (DB) memory suitable for storing a data base (DB) having a plurality of fields, wherein a first field stores data that represents an average usage amount of an operation memory used for processing a generated target workload; an allocation unit suitable for allocating an usage amount of an operation memory for processing a current target workload based on a value of the first field stored in the DB, corresponding to the current target workload requested to be processed; and a monitor suitable for updating the value of the first field to the average usage amount of the operation memory allocated for processing the current target workload after the processing of the current target workload is completed.

DETAILED DESCRIPTION

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Figure 1:
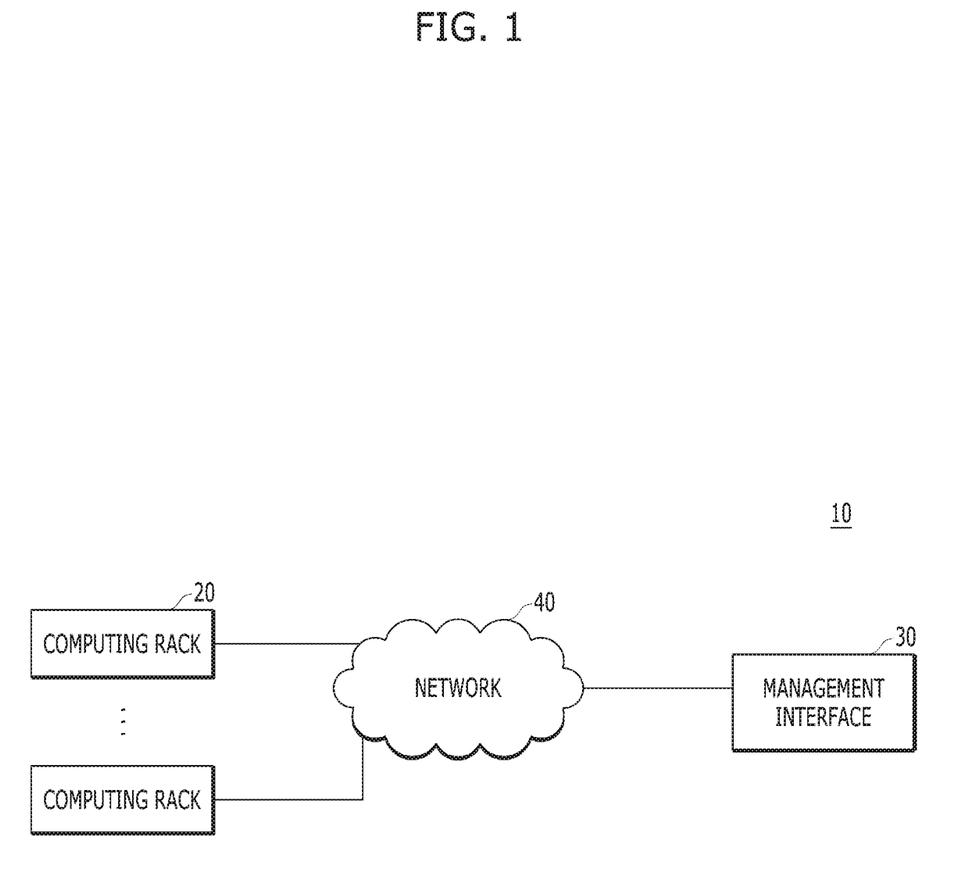
FIG. 1 is a diagram illustrating a data processing system 10.

FIG. 1 is a diagram illustrating a data processing system 10.

Referring to FIG. 1, the data processing system 10 may include a plurality of computing racks 20, a management interface 30, and a network 40 to support communication therebetween. The data processing system 10 having such a rack-scale architecture may be used for a data center established for processing large-capacity data.

Each of the computing racks 20 may be arranged by a single computing device. Alternatively, each of the computing racks 20 may be configured in a single computing device with other computing racks. Specific configurations, designs, and operations of these computing racks will be described later on.

The management interface 30 may provide an interactive interface that allows a user to control, manipulate, operate and manage the data processing system 10. The management interface 30 may be implemented with any type of computing device including a computer, a multiprocessor system, a server, a rack-mount server, a blade server, a lap-top computer, a notebook computer, a tablet computer, a wearable computing device, a network device, a web device, a distributed computing system, a processor-based system, and/or a consumer electronic device.

In an embodiment of the disclosure, the management interface 30 may be implemented with a distributed system configured to perform arithmetic functions through the computing racks 20 or user interface functions via the management interface 30. In an embodiment, the management interface 30 may be implemented with a virtual server that is composed of multi-computing devices distributed through the network 40 and operates as a cloud. The management interface 30 may include a processor, an input/output subsystem, a memory, a data storage device, and a communication circuit.

The network 40 may transmit and receive data between the computing racks 20 and the management interface 30 and/or between the computing racks 20. The network 40 may be implemented with an appropriate number of various wires and/or wired networks. By way of example but not limitation, the network 40 may be implemented with or include wired or wireless local area networks (LAN), wide area networks (WAN), cellular networks, and/or publicly-accessible global networks such as an internet. In addition, the network 40 may include an appropriate number of auxiliary network devices such as auxiliary computers, routers and switches.

Figure 2:
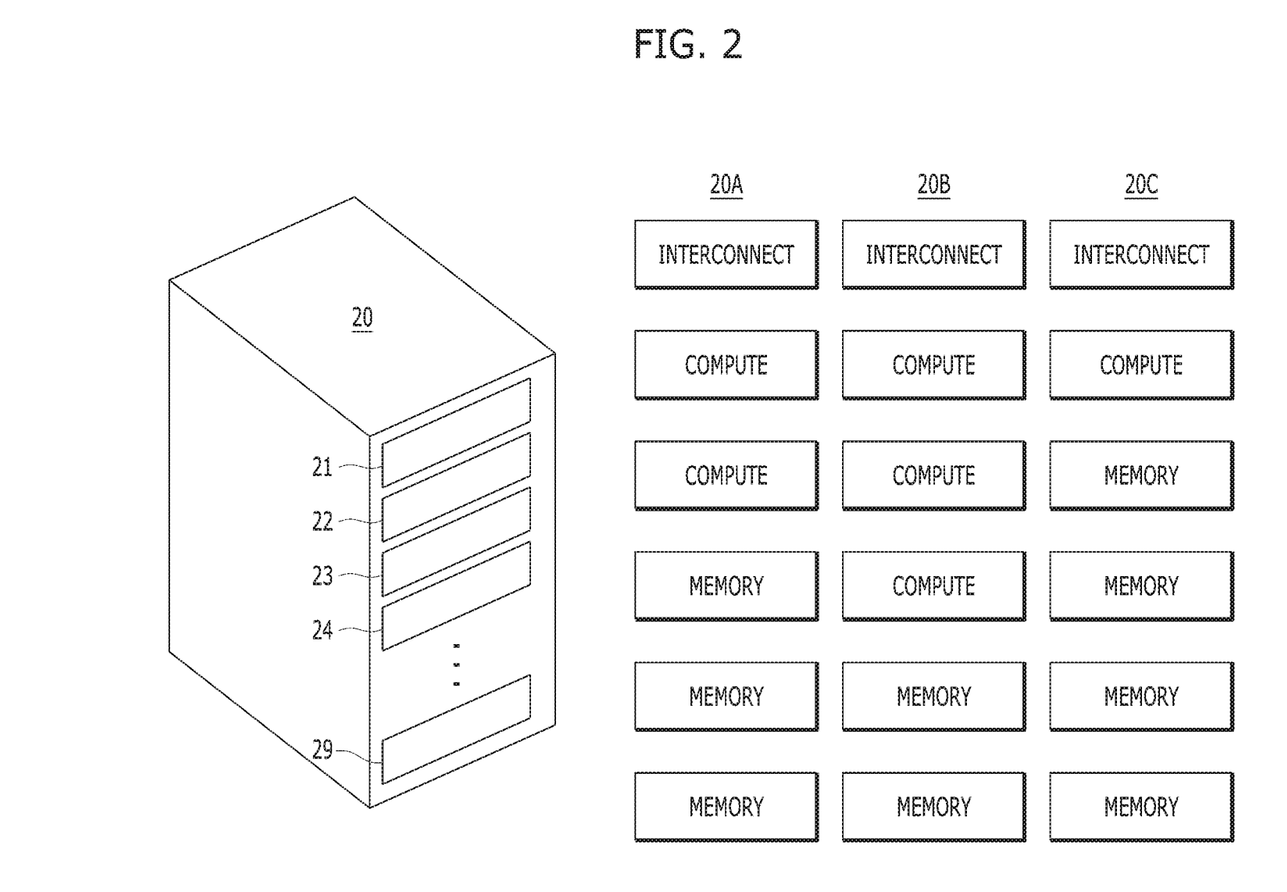
FIG. 2 is a diagram illustrating a computing device having a rack architecture in accordance with an embodiment of the present invention.

FIG. 2 is a diagram illustrating a computing device having a rack architecture in accordance with an embodiment of the disclosure.

Referring to FIG. 2, the computing rack 20 may not be limited to structures, types and names of components and include various types of components. By way of example but not limitation, the computing rack 20 may include a plurality of drawers 21 to 29. Each of the drawers 21 to 29 may include a plurality of modules. Each of the modules may include a plurality of blades.

According to various embodiments, the computing rack 20 may be implemented with a combination of an appropriate number of computing blades, memory blades, and/or interconnecting blades. Herein, although the computing rack 20 is implemented with a combination of a plurality of blades, the computing rack 20 may be defined as being implemented in various names such as drawers, modules, trays, boards, sashes or units. The computing rack 20 may have a structure in which components are disaggregated and distinguished according to functions for convenience of implementation. Although not limited, the computing rack 20 may be disaggregated in the order of interconnecting blades, computing blades and memory blades from the top. The computing rack 20 and the computing device implemented thereby may be referred to as "rack-scale systems" or "disaggregated systems".

According to various embodiments, the computing device may be implemented with a single computing rack 20. Alternatively, the computing device may include all components included in two or more computing racks, a combination of some components included in two or more computing racks or some components included in a single computing rack 20.

According to various embodiments, the computing device may be implemented with a combination of an appropriate number of computing blades, memory blades, and/or interconnecting blades included in the computing rack 20. By way of example but not limitation, a computing device 20A may be implemented with two computing blades, three memory blades and one interconnecting blade. For another example, a computing device 20B may be implemented with three computing blades, two memory blades and one interconnecting blade. For another example, a computing device 20C may be implemented with one computing blade, four memory blades and one interconnecting blade.

Although FIG. 2 illustrates that the computing rack 20 is implemented with the combination of computing blades, memory blades and/or interconnecting blades, the computing rack 20 may further include other components such as a power system, a cooling system, input/output devices capable of being verified in a conventional server or the like.

Figure 3:
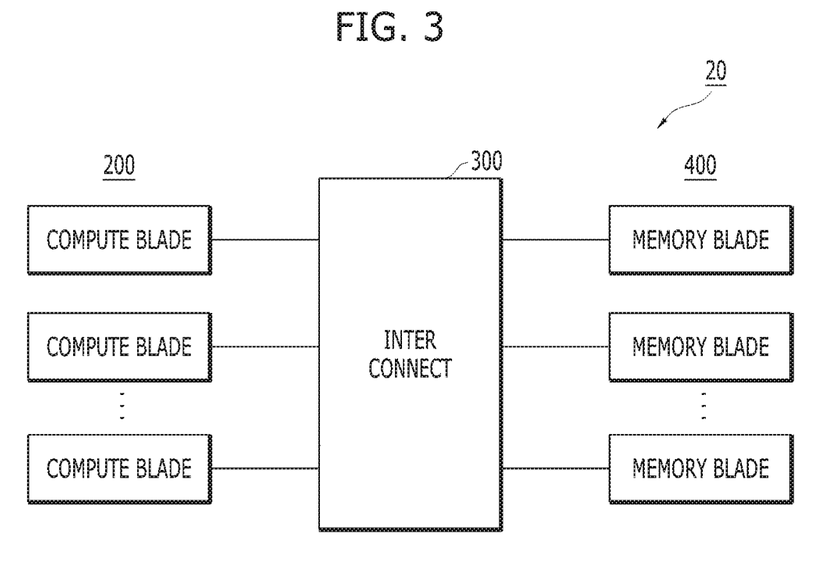
FIG. 3 is a block diagram illustrating a computing device in accordance with an embodiment of the present invention.

FIG. 3 is a block diagram illustrating a computing device in accordance with an embodiment of the present invention.

Referring to FIG. 3, the computing device may include a plurality of computing blades 200, a plurality of memory blades 400, and an interconnecting blade 300. The computing blades 200 may be qualified as pooled computing blades, pooled computing systems and so on. Similarly, the memory blades 400 may be qualified as pooled memory blades, pooled memory systems and so on. Although the computing device is a combination of the multiple blades, it may be implemented in various names such as drawers, modules, trays, boards, chassis or units.

Each of the computing blades 200 may include processing elements such as one or more processors, a processing/control circuit or a central processing unit (CPU).

Each of the memory blades 400 may include various types of memories such as a plurality of volatile memories and/or nonvolatile memories. By way of example but not limitation, each of the memory blades 400 may include a plurality of dynamic random access memories (DRAM), flash memories, memory cards, hard disk drives (HDD), solid state drives (SSD), and/or combinations thereof.

Each of the memory blades 400 may be divided, allocated or designated by one or more processing elements included in each of the computing blades 200. Also, each of the memory blades 400 may store one or more operating systems (OS) initialized and/or performed by the computing blades 200.

The interconnecting blade 300 may be implemented with a communication circuit, a device or a combination thereof that is divided, allocated or designated by the processing elements included in each of the computing blades 200. By way of example but not limitation, the interconnecting blade 300 may be implemented with network interface ports, cards or switches. The interconnecting blade 300 may use protocols related to one or more types of wires or wired communication technologies for data communication. By way of example but not limitation, the interconnecting blade 300 may support communication between the computing blades 200 and the memory blades 400 according to the protocols such as Peripheral Component Interconnect Express (PCIE), Quick Path Interconnect (QPI) and Ethernet.

Figure 4:
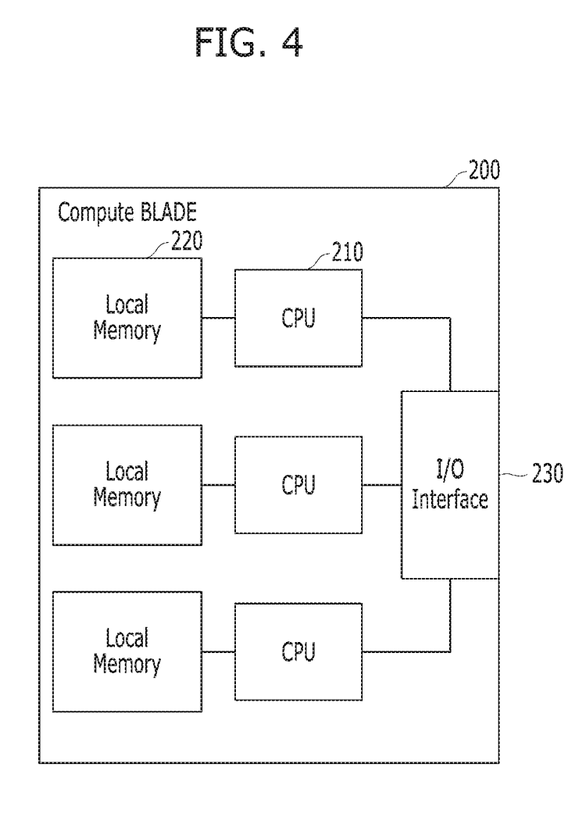
FIG. 4 is a block diagram illustrating the computing blade 200 in accordance with an embodiment of the present invention.

FIG. 4 is a block diagram illustrating the computing blade 200 in accordance with an embodiment of the disclosure.

Referring to FIG. 4, the computing blade 200 may include one or more central processing units (CPU) 210, one or more local memories 220, and an input/output (I/O) interface 230.

For operations, the CPUs 210 may divide, allocate and designate one or more memory blades among the memory blades 400 shown in FIG. 3. Besides, the CPUs 210 may initialize one or more memory blades, which are divided, allocated and designated, and may perform at least one of a read operation, a write (or program) operation, etc. with a data through the memory blades.

The logic memories 220 may store data for operation of the CPU 210. According to an embodiment, a single local memory 220 may one to one correspond to a single CPU 210.

The I/O interface 230 may support interfacing between the CPUs 210 and the memory blades 400 through the interconnecting blade 300 shown in FIG. 3. The I/O interface 230 may output transmission data from the CPUs 210 to the interconnecting blade 300 and input reception data from the interconnecting blade 300 to the CPUs 210 by using protocols related to one or more types of wires or one or more wired communication technologies. By way of example but not limitation, the I/O interface 230 may support communication between the CPUs 210 and the interconnecting blade 300 according to the protocols such as a Peripheral Component Interconnect Express (PCIe), a QuickPath Interconnect (QPI) and an Ethernet.

Figure 5:
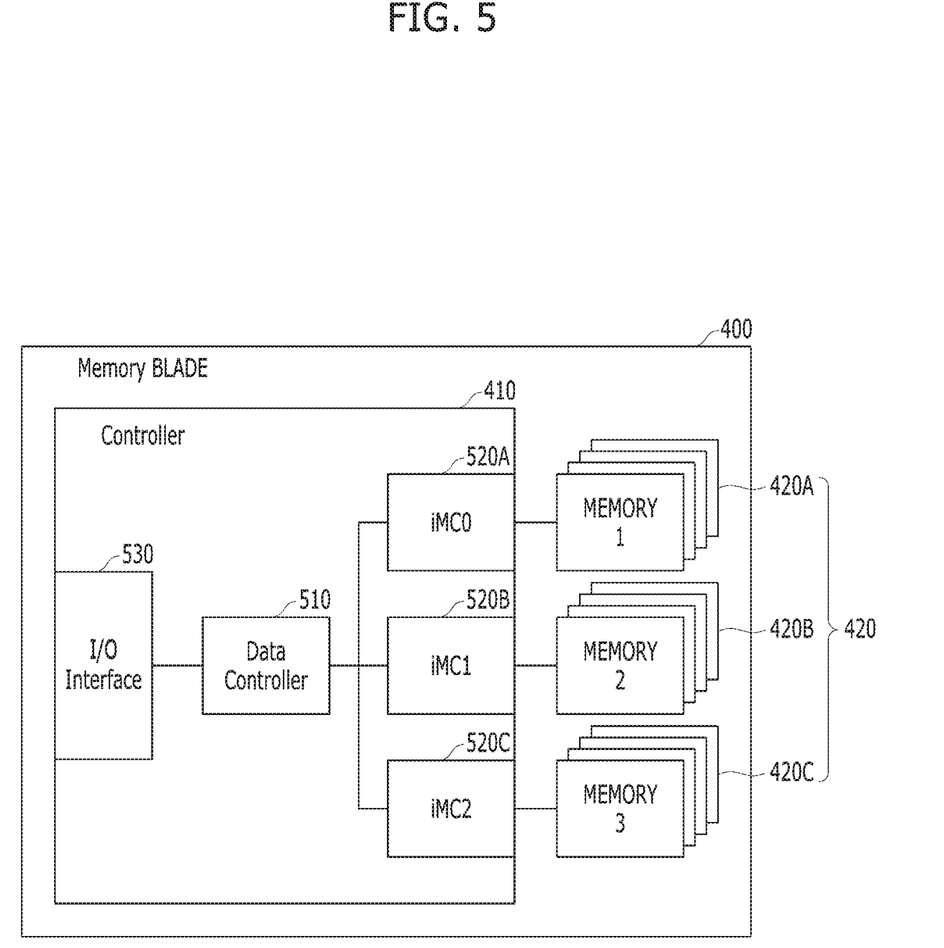
FIG. 5 is a block diagram illustrating the memory blade 400 in accordance with an embodiment of the present invention.

FIG. 5 is a block diagram illustrating the memory blade 400 in accordance with an embodiment of the present invention.

Referring to FIG. 5, the memory blade 400 may include a controller 410 and a plurality of memories 420. The memories 420 may store or write data under a control of the controller 410 and output or read the stored data. The memories 420 may include a first group of memories 420A, a second group of memories 420B and a third group of memories 420C. The first group of memories 420A, the second group of memories 420B and the third group of memories 420C may have the same characteristics or different characteristics. In an embodiment, the first group of memories 420A, the second group of memories 420B and the third group of memories 420C may have different characteristics in views of storage capacity or latency.

The controller 410 may include a data controller 510, memory controllers (MC) 520A to 520C and an I/O interface 530.

The data controller 510 may handle data which is delivered between the computing blades 200 shown in FIG. 3 and the memories 420. By way of example but not limitation, in response to a write request or command, the data controller 510 may receive data for a write operation, which is delivered from the computing blades 200, and may control the write operation for writing the data at a corresponding memory among the memories 420. For another example, in response to a read request or command, the data controller 510 may read data stored in a specific memory among the memories 420, which is requested from the computing blades 200, and may control a read operation for outputting the read data to a corresponding computing blade among the computing blades 200.

The memory controllers 520A to 520C may be disposed between the data controller 510 and the memories 420 and support interfacing therebetween. The memory controllers 520A to 520C may include the memory controller (iMC0) 520A, the memory controller (iMC1) 520B and the memory controller (iMC2) 520C, each corresponding to each of the first group of memories 420A, the second group of memories 420B and the third group of memories 420C included in the memories 420. The memory controller (iMC0) 520A may be disposed between the data controller 510 and the first group of memories 420A and support data transmission/reception therebetween. The memory controller (iMC1) 520B may be disposed between the data controller 510 and the second group of memories 420B and may support data communication, i.e., transmission and reception, therebetween. The memory controller (iMC2) 520C may be arranged between the data controller 510 and the third group of memories 420C and may support data transmission/reception therebetween. When the third group of memories 420C are flash memories, the memory controller (iMC2) 520C may be a flash controller as shown in FIG. 5.

The I/O interface 530 may support interfacing between the data controller 510 and the computing blades 200 through the interconnecting blade 300 shown in FIG. 3. The I/O interface 530 may output data, transmitted from the data controller 510, to the interconnecting blade 300 and may input data, entered from the interconnecting blade 300, to the data controller 510, by using protocols related to one or more types of wires or one or more wired communication technologies. By way of example but not limitation, the I/O interface 530 may support data communication between the data controller 510 and the interconnecting blade 300 according to the protocols such as a Peripheral Component Interconnect Express (PCIe), a QuickPath Interconnect (QPI) and an Ethernet.

As described above, a server system or data processing system, such as a future data center, may have a structure in which a plurality of blades, such as computing blades, memories or storage blades, are separately mounted within a unit rack. At this time, one memory blade may include a plurality of memories having different characteristics to satisfy various user workloads. That is, one memory blade may be a convergence memory device having a converged form of a plurality of memories such as a DRAM, a PCRAM, an MRAM, an STT-RAM and a flash memory. This convergence memory device may be applicable to various usage models because each memory has different characteristics.

Figure 6:
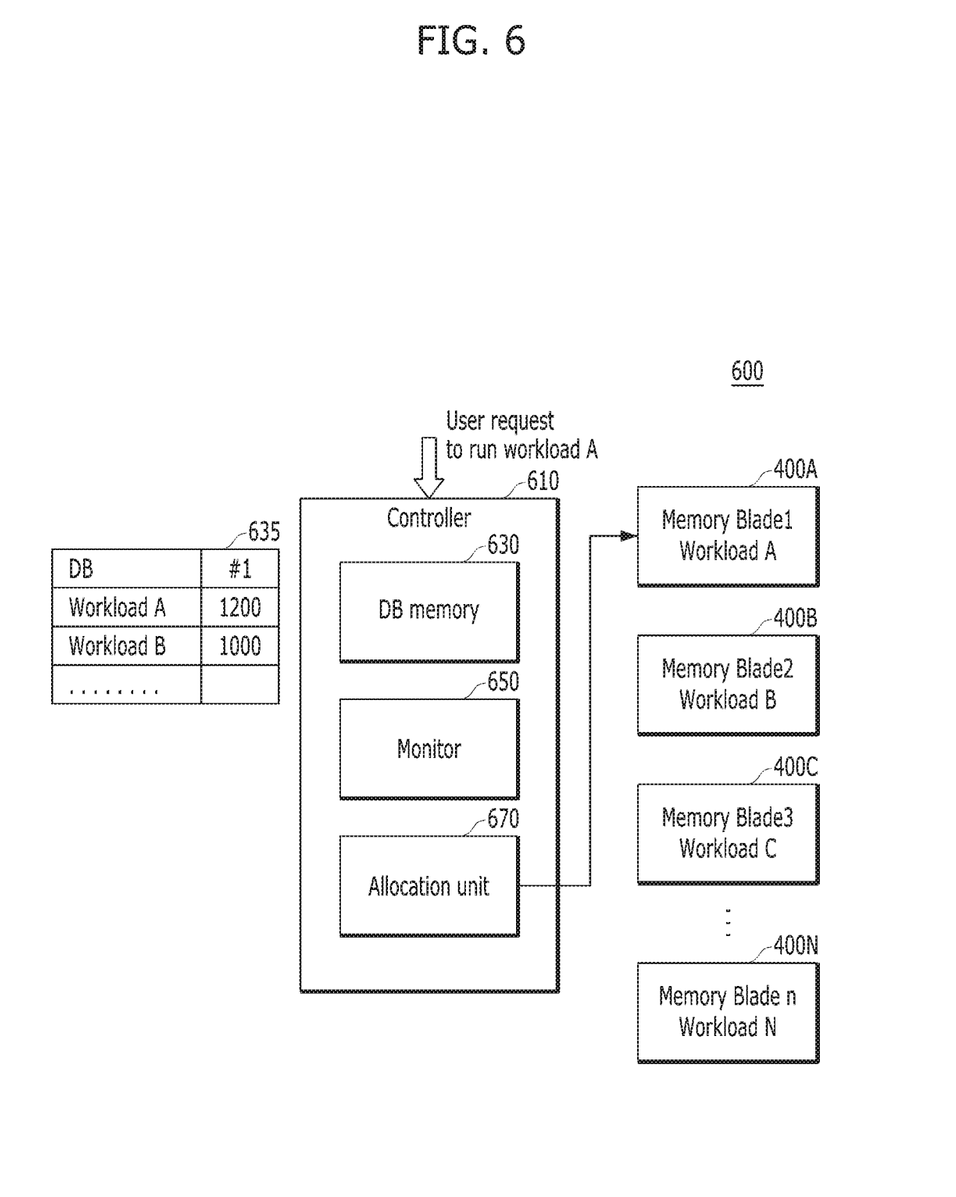
FIG. 6 is a block diagram illustrating a memory system 600 in accordance with an embodiment of the present invention.

FIG. 6 is a block diagram illustrating a memory system 600 in accordance with an embodiment of the disclosure.

Referring to FIG. 6, the memory system 600 may include a controller 610 and a plurality of memory blades 400. The controller 610 may include the computing blades 200 and the interconnecting blade 300 as shown in FIG. 3. Accordingly, the controller 610 may communicate with each of the memory blades 400, and divide, allocate or designate one or more memory blades among the memory blades 400. In addition, the controller 610 may initialize one or more memory blades which are divided, allocated or designated, and may perform a read operation, a write (or program) operation and so on of data through the memory blades.

The controller 610 may further include a data base (DB) memory 630, a monitor 650 and an allocation unit 670.

The DB memory 630 may store a data base (DB) 635. The DB 635 may include information on workloads requested to be processed. Specifically, the DB 635 may include first information #1 which is an average operation memory usage amount used for processing the workloads. Although not illustrated, the DB 635 may include second information #2 which is a final operation memory usage amount used for processing the workloads, third information #3 which is the number of times to process the workloads, and fourth information #4 on a ratio of an operation for processing the workloads, i.e., a ratio of the write operation with respect to the read operation. The DB 635 may have fields of the first to fourth information #1 to #4 and be composed of the workloads as an entry. By way of example but not limitation, a value of the first information #1 of a workload A, that is, an average operation memory usage amount used for processing the workload A may be registered as "1200" in the DB 635 shown in FIG. 6. However, a workload that has not been processed in the memory system 600 may not be registered in the DB 635. Accordingly, such workload may be newly registered in the DB 635.

The monitor 650 may check whether a value of the first information #1 corresponding to a workload requested to be processed is stored in the DB memory 630. As described above, when the value of the first information #1 is not registered in the DB 635, the monitor 650 may register information on a corresponding workload in the DB 635. When the value of the first information #1 is registered in the DB 635, the value of the first information #1 may be a criterion of a memory allocation amount for processing the corresponding workload. In addition, the monitor 650 may update the DB 635 by checking the first to fourth information #1 to #4 after the processing of the workloads is completed. Particularly, the first information may be calculated using the second information #2 which is the final operation memory usage amount used for processing the workload and the third information #3 which is the number of times to process the workload. The monitor 650 may check the fourth information #4 to determine whether a corresponding workload is an operation optimized for the read operation or an operation optimized for the write operation. The fourth information #4 may be calculated according to a predetermined criterion. Specifically, the fourth information #4 may be a ratio of a write request with respect to a read request performed to process a target workload. More details will be described below with reference to FIG. 8.

The allocation unit 670 may allocate an operation memory usage amount to process the workloads based on the values of the first information #1 stored in the DB 635. When the target workload is not registered in the entry of the DB 635, the allocation unit 670 may allocate a predetermined memory usage amount. The allocation unit 670 may reflect a predetermined over-provision value in the values of the first information #1 to allocate the operation memory usage amount. By way of example but not limitation, when the value of the first information #1 of the workload A is "1200", the allocation unit 670 may not allocate the operation memory usage amount as "1200," but may allocate the operation memory usage amount as "1320" obtained by reflecting the over-provision value in the value of the first information #1, that is, by adding approximately 10% to the value of the first information #1. When additional allocation is requested due to a lack of an operation memory allocation amount, the allocation unit 670 may allocate an additionally predetermined operation memory usage amount dynamically.

To handle the workloads based on the value of the first information #1 stored in the DB 635, the allocation unit 670 may assign an operation memory usage amount to any one of a plurality of operation memories. For example, when the workloads are optimized for the read operation, the allocation unit 670 may allocate the operation memory usage amount to a specific operation memory optimized for the read operation. When the workloads are optimized for the write operation, the allocation unit 670 may allocate the operation memory usage amount to another operation memory optimized for the write operation.

The memory blades 400 may include the plurality of operation memories. The operation memories may be divided into a read-type operation memory optimized for the read operation, a write-type operation memory optimized for the write operation and a normal-type operation memory, depending on a predetermined criterion. By way of example but not limitation, the read-type operation memory may use a 3-clock (three clock cycles) when the read operation is performed, while using a 7-clock (seven clock cycles) when the write operation is performed. The write-type operation memory may use the 7-clock when the write operation is performed, while using the 3-clock when the read operation is performed. The normal-type operation memory may use a 5-clock (five clock cycles) respectively when the read operation and the write operation are performed. This is merely an example, and the disclosure is not limited thereto. A clock to be used may be set reflecting speed and characteristics of a memory or selecting any one of existing options.

Figure 7:
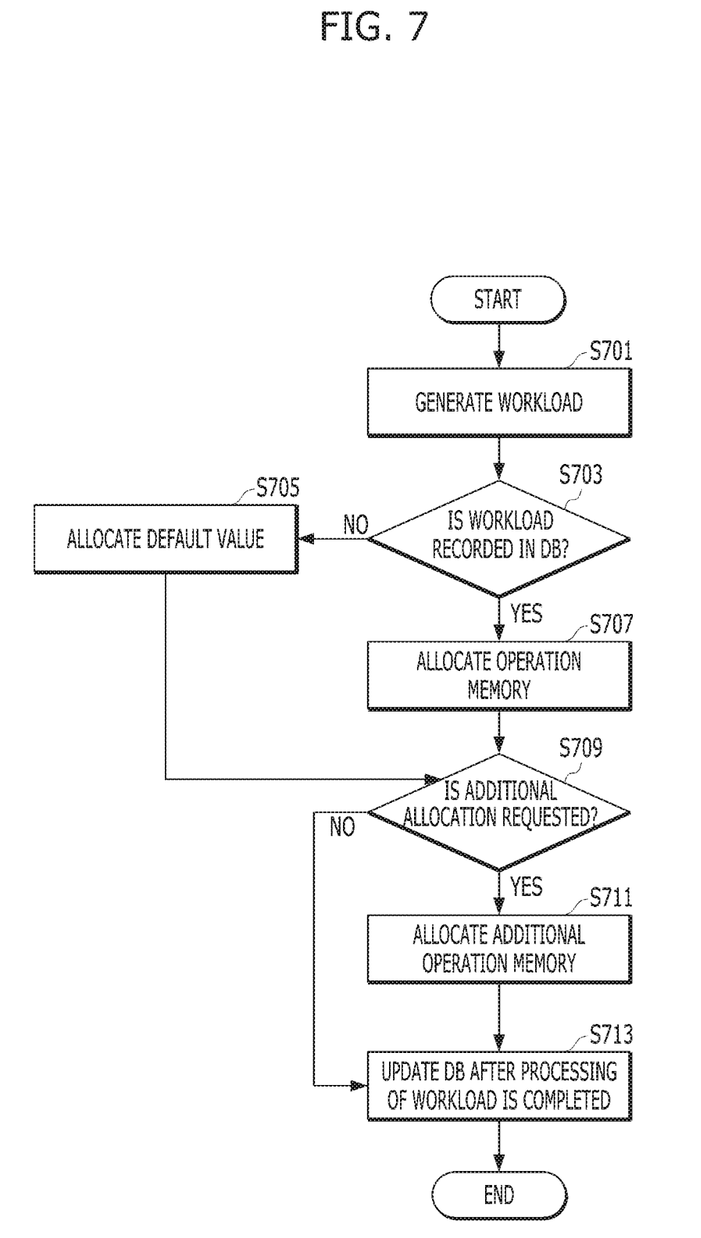
FIG. 7 is a flowchart illustrating an operation of the memory system 600 in accordance with an embodiment of the present invention.

FIG. 7 is a flowchart illustrating an operation of the memory system 600 in accordance with an embodiment of the disclosure.

In step S701, a request for processing a workload may be generated from an external device.

In step S703, the monitor 650 may check whether a requested workload is registered in the DB 635 by checking the DB 635 stored in the DB memory 630. Specifically, the monitor 650 may check whether a target workload is registered in an entry of the DB 635.

When the target workload is not registered in the entry (that is, "NO" in step S703), the allocation unit 670 may allocate the predetermined operation memory usage amount to process the target workload in step S705. A subsequent step S709 may be carried out.

When the target workload is registered in the entry (that is, "YES" in step S703), the allocation unit 670 may allocate the operation memory usage amount based on the values of the first information #1 registered in the DB 635 in step S707. Although not illustrated, the allocation unit 670 may allocate the operation memory usage amount by reflecting the predetermined over-provision value.

In step S709, the allocation unit 670 may receive a request for allocating an additional operation memory due to a lack of the operation memory allocation amount.

When additional allocation is requested (that is, "YES" in step S709), the allocation unit 670 may allocate the additional operation memory usage amount with a predetermined value in step S711.

When additional allocation is not requested (that is, "NO" in step S709), the allocation unit 670 may carry out a subsequent step S713.

In step S713, the monitor 650 may update the first to fourth information #1 to #4 stored in the DB 635 after the processing of the workload is completed. When a request for processing the same workload is subsequently generated, an operation memory usage amount may be appropriately allocated based on the updated DB 635 as described above, and the additional operation memory allocation may be reduced so that performance of the memory system 600 may be enhanced.

Figure 8:
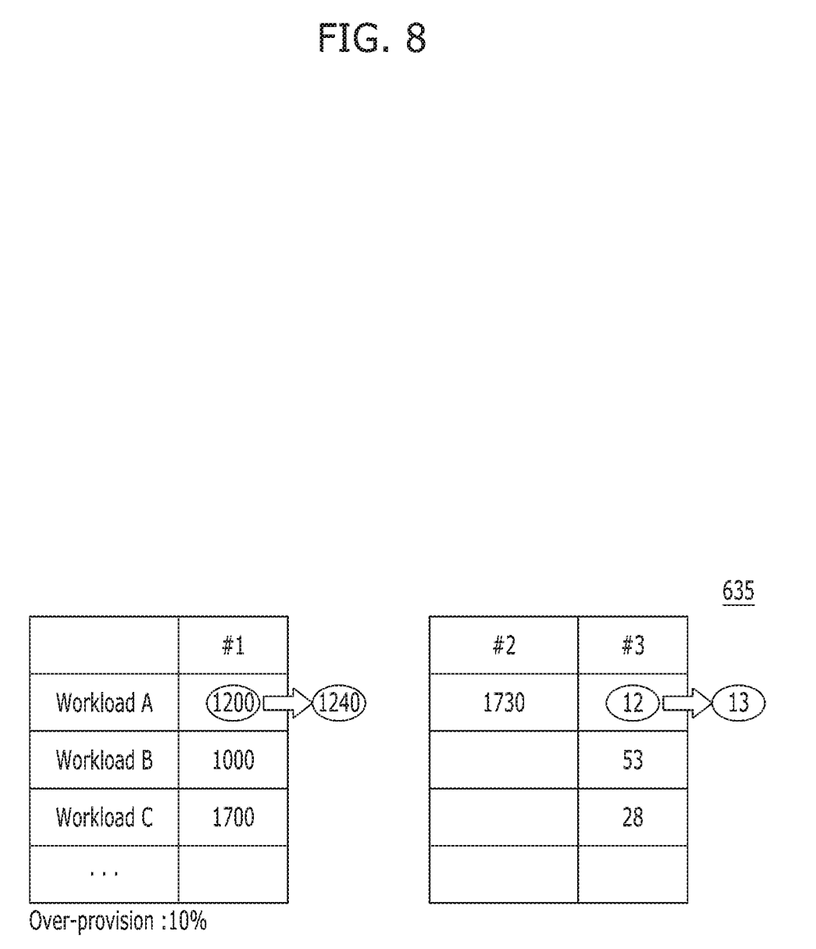
FIG. 8 is a diagram illustrating the values registered in the DB 635 in accordance with an embodiment of the present invention.

FIG. 8 is a diagram illustrating the values registered in the DB 635 in accordance with an embodiment of the disclosure.

As described above, the DB 635 may have fields of the first to fourth information #1 to #4 which are composed of the workloads as entries. Only the workloads that have been processed may be registered in the DB 635.

The first information #1 may represent an average operation memory usage amount used for processing a corresponding workload. By way of example but not limitation, an average operation memory usage amount used for processing the workload A may be registered as "1200." As described above, the allocation unit 670 may initially allocate an operation memory corresponding to the registered amount "1200" to process the workload A. When the over-provision is approximately 10%, the allocation unit 370 may allocate an operation memory usage amount corresponding to the amount "1320" obtained by adding approximately 10% of "1200" to the operation memory usage amount "1200."

The second information #2 may represent a final operation memory usage amount used for processing the workload A. Considering that a value of the second information #2 is "1730," it is likely that additional operation memory allocation is required due to a lack of an operation memory amount corresponding to "1320" which is initially allocated.

The third information #3 may represent the number of times to process the workload A up to the present. Considering that a value of the third information #3 is "12", the controller 610 may complete processing the workload A 12 times. When the processing of the workload A is further completed, the value of the third information #3 may be updated to "13".

After the processing of the target workload is completed, the monitor 650 may update the first information #1, that is, the average operation memory usage amount used for processing the workload A. The average operation memory usage amount may be obtained by dividing the sum of an initial operation memory allocation amount to a final operation memory usage amount by the number of processing times.

By way of example but not limitation, after the processing of the workload A is completed, the monitor 650 may update the value of the second information #2 and the value of the third information #3. The monitor 650 may calculate the average operation memory allocation amount as "1240"= ([(12*1200)+1730]/13).

In short, the value of the first information #1 may be updated based on the above calculation.

Figure 9:
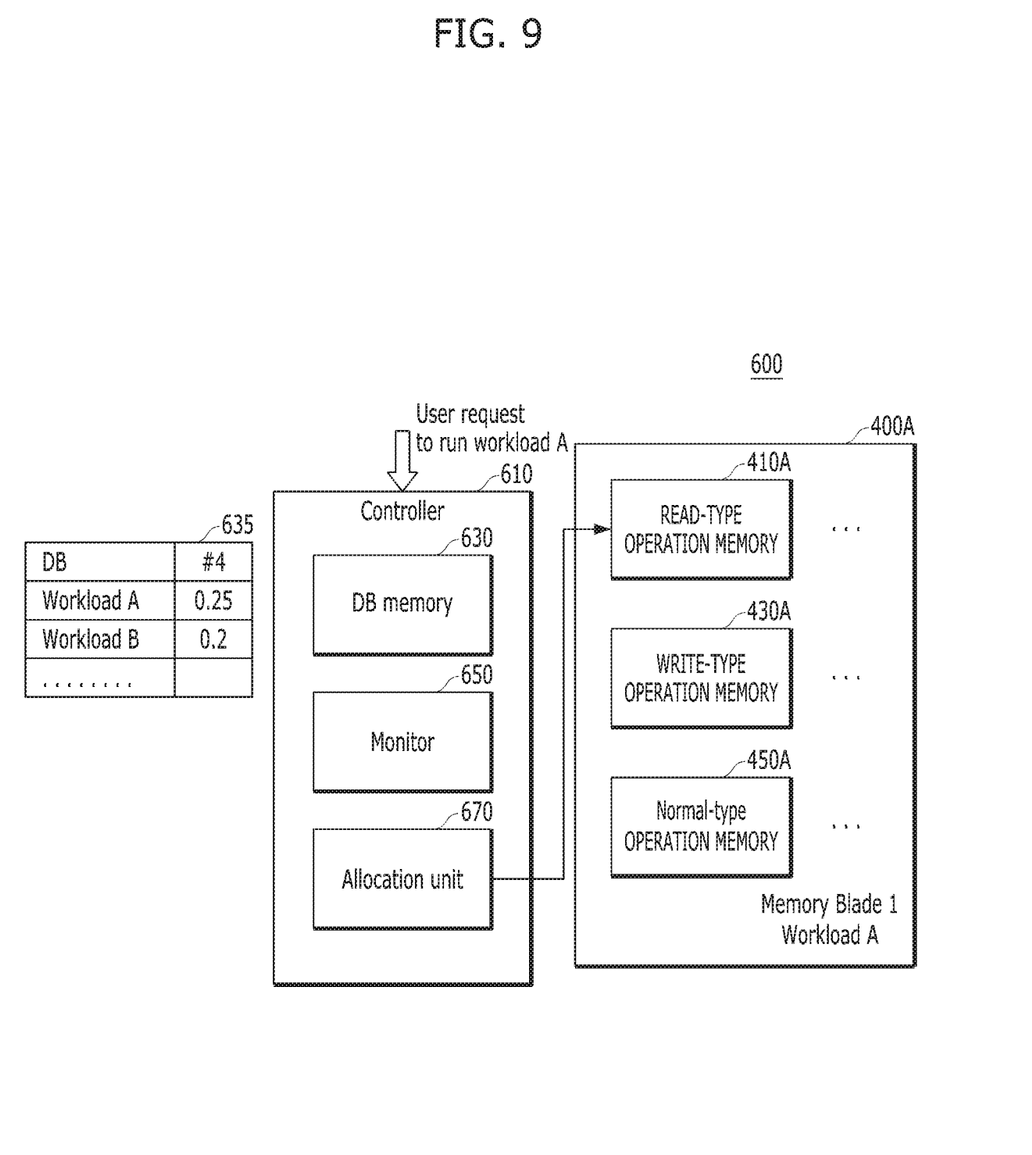
FIG. 9 is a block diagram illustrating an operation of the memory system 600 in accordance with an embodiment of the present invention.

FIG. 9 is a block diagram illustrating an operation of the memory system 600 in accordance with an embodiment of the disclosure. Specifically, FIG. 9 shows a system capable of identifying characteristics of a target workload requested to be processed to allocate an optimized operation memory for processing the target workload.

The monitor 650 may check whether a workload requested to be processed is stored in the entry of the DB 635. As described above, when the target workload is not registered in the entry of the DB 635, the monitor 650 may register information on the workload in the DB 635. When the target workload is registered in the entry of the DB 635, a value of the first information #1 may be a criterion of a memory usage amount for processing the workload. As described above, the monitor 650 may update the first to fourth information #1 to #4 after the processing of the target workload is completed. The fourth information #4 may represent a ratio of a write request with respect to a read request for processing the target workload.

The allocation unit 670 may allocate a workload to an operation memory capable of efficiently processing the workload based on a value of the fourth information #4 stored in the DB 635. The allocation unit 670 may determine which operation the target workload is optimized for, based on the fourth information #4 according to the predetermined criterion. By way of example but not limitation, when the number of read requests to process the target workload is approximately 20% greater than the number of write requests, it may be efficient from a system point of view that the target workload is allocated to a read-type operation memory optimized for the read operation. By way of example but not limitation, when the ratio of the read operation performed to process the workload A to the ratio of the write operation, is higher than a predetermined threshold value, the allocation unit 670 may allocate the workload A to the read-type operation memory optimized for performing the read operation.

Each of the memory blades 400A to 400N may have a plurality of operation memories. By way of example but not limitation, a first memory blade 400A for processing the workload A may be split into a read-type operation memory 410A optimized for the read operation, a write-type operation memory 430A optimized for the write operation, and a normal-type operation memory 450A. A user may determine, establish, or set the types of the operation memories. By way of example but not limitation, the read-type operation memory 410A for the read operation may be allocated to "3" for a clock required for the read operation and "7" for a clock required for the write operation. The write-type operation memory 430A for the write operation may be allocated to "3" for a clock required for the write operation and "7" for a clock required for the read operation. Further, the normal-type operation memory 450A may be allocated equally for clocks required for the read operation and the write operation. Therefore, when the ratio of the read operation is higher than the ratio of the write operation among the operations requested to process the workload A, the allocation unit 670 may allocate the workload A to the read-type operation memory 410A among the plurality of operation memories of the first memory blade 400A.

Figure 10:
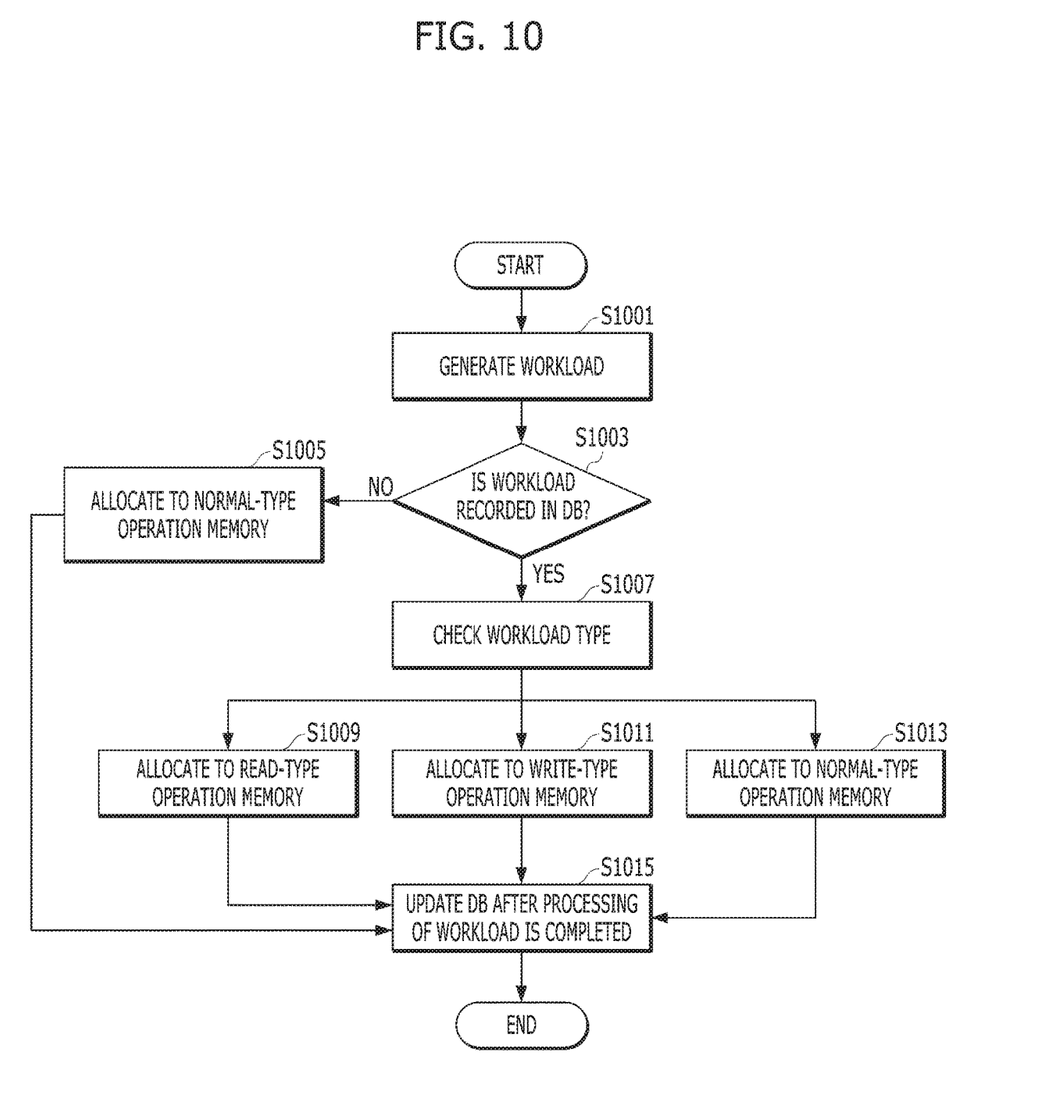
FIG. 10 is a flowchart illustrating an operation of the memory system 600 in accordance with an embodiment of the present invention.

FIG. 10 is a flowchart illustrating an operation of the memory system 600 in accordance with an embodiment of the present invention.

In step S1001, a request for processing a workload may be generated from an external device.

In step S1003, the monitor 650 may check whether a requested workload is registered in the DB 635 by checking the entry of the DB 635 stored in the DB memory 630.

When the target workload is not registered in the entry (that is, "NO" in step S1003), the allocation unit 670 may allocate the target workload to the normal-type operation memory to process the target workload in step S1005.

When the target workload is registered in the entry (that is, "YES" in step S1003), the allocation unit 670 may check the ratio of the write request with respect to the read request for processing the workload based on the value of the fourth information #4 registered in the DB 635 in step S1007.

When the ratio of the read request for processing the workload is higher than the ratio of the write request ("read-type" in step S1007), the allocation unit 670 may allocate the workload to the read-type operation memory optimized for the read operation in step S1009.

When the ratio of the write request for processing the workload is higher than the ratio of the read request ("write-type" in step S1007), the allocation unit 670 may allocate the workload to the write-type operation memory optimized for the write operation in step S1011.

When the ratio of the read request is the same as the ratio of the write request ("normal-type" in step S1007), the allocation unit 670 may allocate the workload to the normal-type operation memory to process the workload in step S1013.

In step S1015, the monitor 650 may update the fourth information #4 stored in the DB 635 after the processing of the workload is completed. When a request for processing the same workload is subsequently generated, the target workload may be allocated to the optimal operation memory based on the updated DB 635 as described above so that performance of the memory system 600 may be maximized.

In embodiments of the disclosure, in order to efficiently process a workload generated from an external device, the controller 610 may create the DB 635 for the processing of the workload, and allocate an optimal operation memory usage amount based on the DB 635 for a workload that has been processed. As a result, the additional operation memory allocation may be reduced so that the entire system may shorten the waiting time required for allocating the operation memory. In addition, the controller 610 may divide a plurality of memories into memories optimized for a plurality of operations so as to efficiently process the workload. Consequently, the entire system may efficiently process the workload generated from the external device in a short time.

While the present invention has been described with respect to specific embodiments, it will be apparent to those skilled in the art that various changes and modifications may be made without departing from the spirit and scope of the invention as defined in the following claims.

What is claimed is:

1. A memory system, comprising:
    a memory blade including a plurality of operation memories including a first read-type memory, a second write-type memory and a third normal-type memory; and
    a controller coupled to the memory blade,
    wherein the controller includes:
    a data base (DB) memory suitable for storing a data base (DB) having usage-amount information, which is an average usage amount of an operation memory used for processing a generated target workload, as a field and workloads as an entry;

an allocation unit suitable for allocating a usage amount of an operation memory for processing a current target workload, corresponding to the current target workload requested to be processed, wherein the allocation unit determines the usage amount by multiplying a value of the usage-amount information of the current target workload by a value larger than '1'; and a monitor suitable for updating the value of the usage-amount information to the average usage amount of the operation memory allocated for processing the current target workload after the processing of the current target workload is completed, wherein the DB further includes fourth read/write-ratio information, which is a ratio of a write request with respect to a read request for processing the current target workload, as the field, wherein the allocation unit allocates the first read-type memory whose read operation execution time is shorter than a write operation execution time of the first read-type memory, when the number of read requests to process the current target workload is greater than the number of write requests according to the read/write-ratio information, wherein the allocation unit allocates the second-write type memory whose write operation execution time is shorter than a read operation execution time of the second-write type memory, when the number of write requests to process the current target workload is greater than the number of read requests according to the read/write-ratio information, and wherein the allocation unit allocates the third-normal type memory whose read operation execution time and write operation execution time is same, when the number of write requests to process the current target workload is same to the number of read requests according to the read/write-ratio information.

2. The memory system of claim 1, wherein the allocation unit additionally allocates the usage amount of the operation memory, which is set in advance, when there is an additional allocation request for the usage amount of the operation memory to process the current target workload.

3. The memory system of claim 2, wherein the DB further includes second information, which is a final operation memory usage amount used for processing the current target workload, as the field, and wherein the monitor updates a value of the second information to the final operation memory usage amount allocated for processing the current target workload after the processing of the current target workload is completed.

4. The memory system of claim 3, wherein the DB further includes third information, which is a number of times to process the current target workload, as the field, and wherein the monitor updates a value of the third information to the number of times to process the current target workload after the processing of the current target workload is completed.

5. The memory system of claim 4, wherein the monitor updates the value of the usage-amount information based on the values of the first to third information.

6. The memory system of claim 5, wherein the monitor updates the value of the usage-amount information when the value of the second information is out of a range of a predetermined value.

7. The memory system of claim 1, wherein the allocation unit allocates the operation memory usage amount with a predetermined value to process the current target workload when the current target workload requested to be processed is not registered in the entry.

8. The memory system of claim 1, wherein the monitor updates the value of the read/write-ratio information to the ratio of the write request with respect to the read request for processing the current target workload after the processing of the current target workload is completed.

9. An operating method for a memory system that includes a memory blade including a plurality of operation memories including a first read-type memory, a second write-type memory and a third normal-type memory, and a controller, comprising:

checking whether a value of usage-amount information corresponding to a target workload requested to be processed is stored in a data base (DB) having the usage-amount information, which is an average usage amount of an operation memory used for processing a generated target workload, as a field and workloads as an entry;

allocating a usage amount of an operation memory for processing a current target workload, corresponding to the current target workload requested to be processed, wherein the usage amount is determined by multiplying a value of the usage-amount information of the current target workload by a value larger than '1'; and updating the value of the usage-amount information to the average usage amount of the operation memory allocated for processing the current target workload after the processing of the current target workload is completed, wherein the allocation unit allocates the first read-type memory whose read operation execution time is shorter than a write operation execution time of the first read-type memory, when the number of read requests to process the current target workload is greater than the number of write requests according to the read/write-ratio information, wherein the allocation unit allocates the second-write type memory whose write operation execution time is shorter than a read operation execution time of the second-write type memory, when the number of write requests to process the current target workload is greater than the number of read requests according to the read/write-ratio information, and wherein the allocation unit allocates the third-normal type memory whose read operation execution time and write operation execution time is same, when the number of write requests to process the current target workload is same to the number of read requests according to the read/write-ratio information.

10. The operating method of claim 9, further comprising:

additionally allocating the usage amount of the operation memory, which is set in advance, when there is an additional allocation request for the usage amount of the operation memory to process the current target workload.

11. The operating method of claim 10, wherein the DB further includes second information, which is a final operation memory usage amount used for processing the current target workload, as the field, and wherein the updating of the value of the usage-amount information to the average usage amount of the operation memory is carried out to update a value of the second information to the final operation memory usage amount allocated for processing the current target workload after the processing of the target workload is completed.

12. The operating method of claim 11, wherein the DB further includes third information, which is a number of times to process the target workload, as the field, and wherein the updating of the value of the usage-amount information to the average usage amount of the operation memory is carried out to update a value of the third information to the number of times to process the current target workload after the processing of the current target workload is completed.

13. The operating method of claim 12, wherein the updating of the value of the usage-amount information to the average usage amount of the operation memory is carried out to update the values of the usage-amount information based on the values of the first to third information.

14. The operating method of claim 13, wherein the updating of the value of the usage-amount information to the average usage amount of the operation memory is carried out to update the value of the usage-amount information when the value of the second information is out of a range of a predetermined value.

15. The operating method of claim 9, wherein the allocating of the usage amount of the operation memory is carried out to allocate the operation memory usage amount with a predetermined value to process the target workload when the target workload requested to be processed is not registered in the entry.

16. The operating method of claim 15, wherein the updating of the value of the usage-amount information to the average usage amount of the operation memory is carried out to update the value of the read/write-ratio information to the ratio of the write request with respect to the read request for processing the current target workload after the processing of the target workload is completed.

17. A memory system, comprising:
a memory blade including a plurality of operation memories including a first read-type memory, a second write-type memory and a third normal-type memory; and
a controller coupled to the memory blade,
wherein the controller includes:
a data base (DB) memory suitable for storing a data base (DB) having a plurality of fields,
wherein a first field stores data that represents an average usage amount of an operation memory used for processing a generated target workload;
an allocation unit suitable for allocating a usage amount of an operation memory for processing a current target workload based on a value of the first field stored in the DB, corresponding to the current target workload requested to be processed, wherein the allocation unit determines the usage amount by multiplying a value of the average usage amount of the current target workload by a value larger than '1'; and
a monitor suitable for updating the value of the first field to the average usage amount of the operation memory allocated for processing the current target workload after the processing of the current target workload is completed,
wherein the DB further includes read/write-ratio information, which is a ratio of a write request with respect to a read request for processing the current target workload, as the field,
wherein the allocation unit allocates the first read-type memory whose read operation execution time is shorter than a write operation execution time of the first read-type memory, when the number of read requests to process the current target workload is greater than the number of write requests according to the read/write-ratio information,
wherein the allocation unit allocates the second-write type memory whose write operation execution time is shorter than a read operation execution time of the second-write type memory, when the number of write requests to process the current target workload is greater than the number of read requests according to the read/write-ratio information, and
wherein the allocation unit allocates the third-normal type memory whose read operation execution time and write operation execution time is same, when the number of write requests to process the current target workload is same to the number of read requests according to the read/write-ratio information.

18. The memory system of claim 17, wherein the DB further includes a second field which stores data that represents a final operation memory usage amount used for processing the current target workload, and
wherein the monitor updates a value of the second field to the final operation memory usage amount allocated for processing the current target workload after the processing of the target workload is completed.

19. The memory system of claim 18, wherein the DB further includes a third field which stores data that represents a number of times the current target workload is processed, and
wherein the monitor updates a value of the third field to the number of times the current target workload is processed after the processing of the current target workload is completed.

* * * * *